United States Patent [19]
Lupke

[11] 3,957,386
[45] May 18, 1976

[54] CORRUGATED TUBING PERFORATING MACHINE

[76] Inventor: Manfred A. A. Lupke, 262 Royal Orchard Blvd., Thornhill, Ontario, Canada

[22] Filed: Feb. 18, 1975

[21] Appl. No.: 550,458

[52] U.S. Cl. .................................. 408/50; 83/54; 83/282; 83/222; 90/15.1; 83/208
[51] Int. Cl.² ................. B29C 17/10; B23C 1/14; B26D 3/06
[58] Field of Search ................. 83/1, 54, 209, 251, 83/253, 228, 282, 222, 273, 5, 926; 90/15.1; 408/39, 41, 50, 70, 105

[56] References Cited
UNITED STATES PATENTS

| | | | |
|---|---|---|---|
| 3,768,365 | 10/1973 | Howe | 90/15.1 R |
| 3,831,470 | 8/1974 | Maroschak | 83/54 |
| 3,899,265 | 8/1975 | Lang | 408/50 |
| 3,910,713 | 10/1975 | Maroschak | 83/54 |

*Primary Examiner*—Donald R. Schran

[57] ABSTRACT

A machine for perforating corrugated tubing at accurately spaced locations includes a double chain conveyor which positively engages the tubing and is driven intermittently to advance the tubing in steps of equal length. Upon completion of each step a pair of clamping members are actuated to engage the tubing, the clamping faces of the members being shaped so as to locate the tubing positively while it is stationary. When the tubing is so located, accurately positioned sets of cutters are brought into operation so as to cut slots or holes in the tubing at the desired locations. Upon completion of the cutting stroke, the clamping members are automatically released and the conveyor advances the tubing by another step. The sequence of operations in each cycle is controlled by limit switches responsive to the positions of the conveyor, the clamping means and the cutters. The cutters may be rotary saws or rotary drills.

15 Claims, 12 Drawing Figures

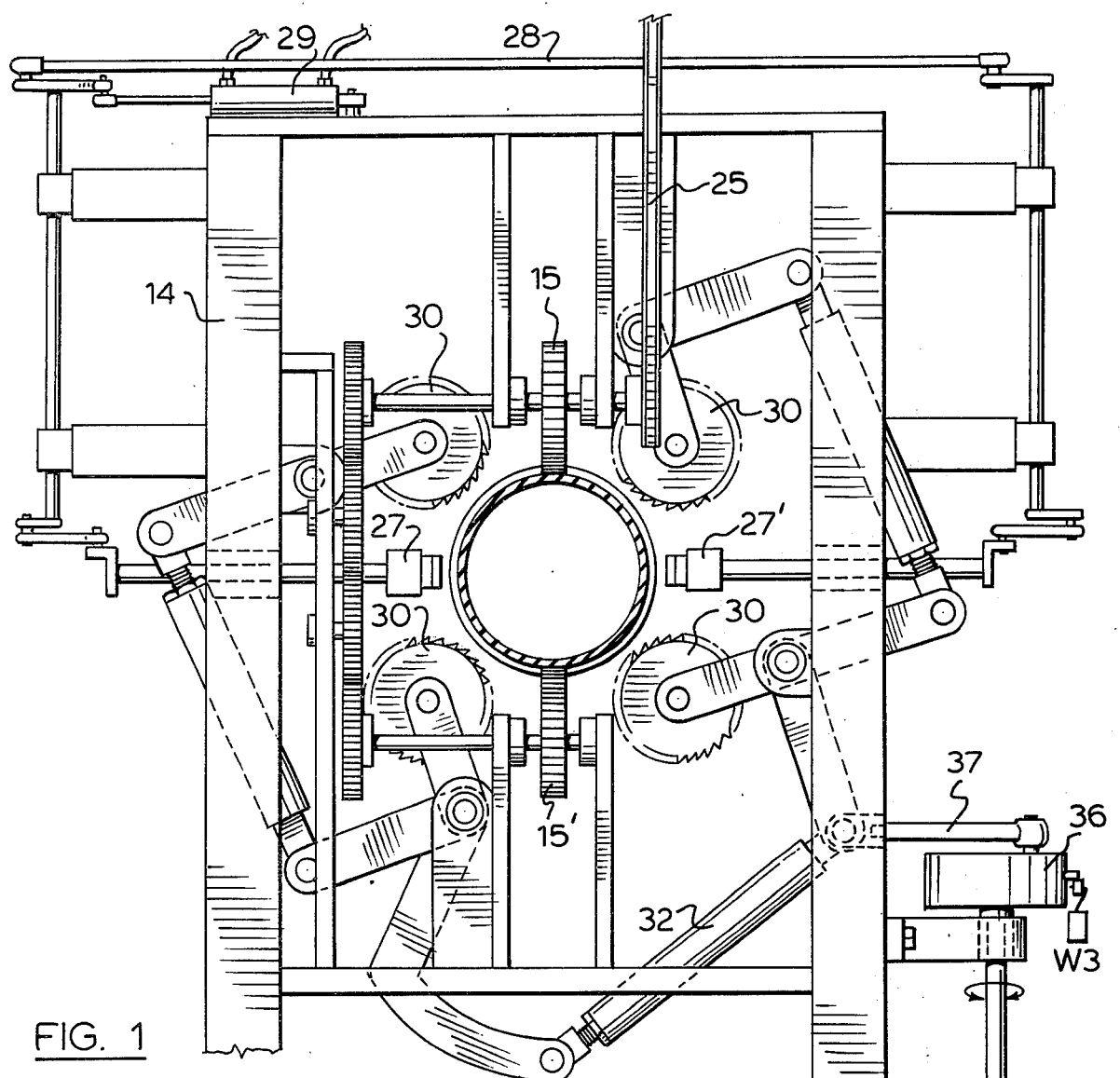
FIG. 1
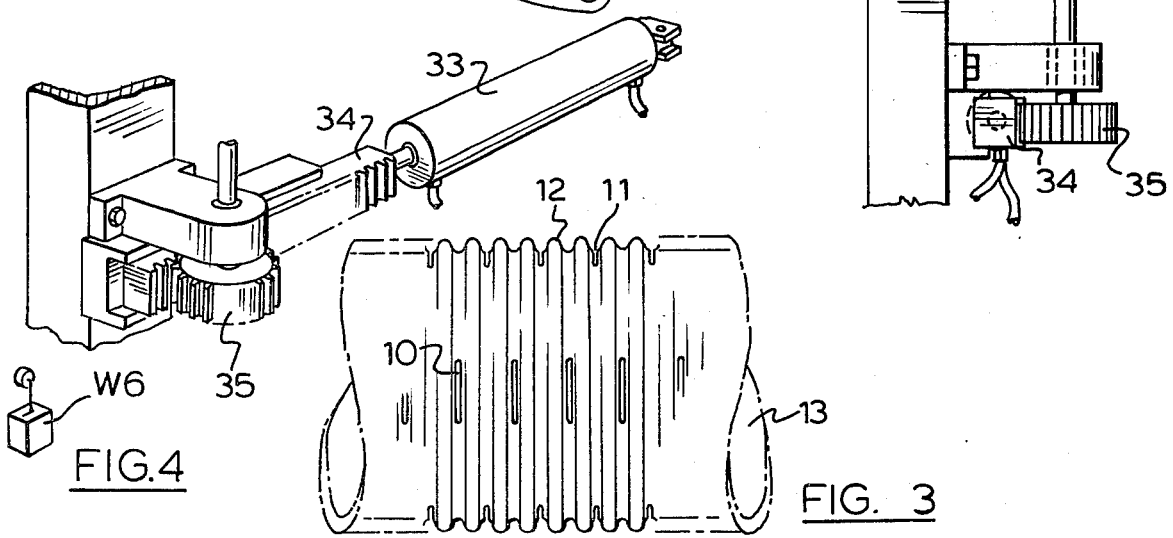
FIG. 4
FIG. 3

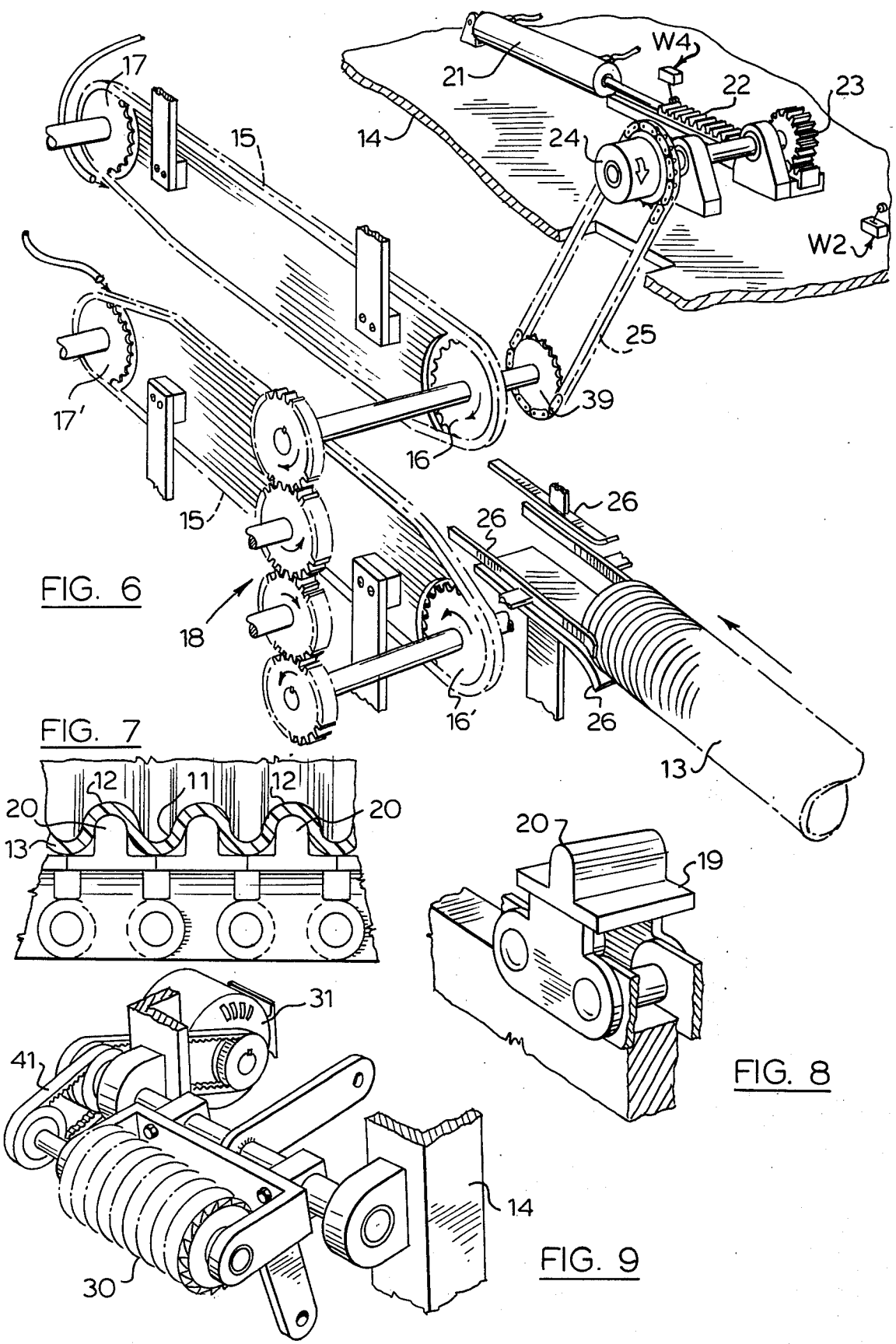

CORRUGATED TUBING PERFORATING MACHINE

BACKGROUND OF THE INVENTION

The invention relates to a machine for perforating corrugated tubing at accurately spaced locations. Such tubing is commonly used for drainage and is frequently of thermoplastic material.

One of the requirements in perforating corrugated tubing is that the perforations be made in the valleys between corrugations; if the requirement is not met the tubing is rendered unsuitable for its purpose. In practice it is difficult to ensure that the requirement is met, especially in the case of thermoplastic tubing which is being fed directly from an extruder and corrugating machine, because of variations in corrugation pitch during cooling and handling, and if the perforations are not accurately located in the valleys as required, a great deal of time and material may be wasted.

According to the present invention the perforations are made by cutters, and the tubing is clamped positively in relation to the cutters during each cutting stroke.

More particularly, a machine in accordance with the present invention comprises a machine frame structure on which are mounted means for advancing the tubing along a predetermined path in intermittent steps of equal length, releasable clamping means operable to clamp the tubing in a stationary position relative to the frame structure, a plurality of cutters each being operable to move through a cutting stroke lying in a plane which is transverse to said predetermined path and intersects a valley between adjacent corrugations of the tubing when the tubing is clamped in the stationary position, and sequencing means for controlling the sequence of machine operations. The sequencing means include means responsive to completion of a step of the advancing means for initiating movement of the clamping members into the clamping position, means operable in accordance with movement of the clamping members into the clamping position for initiating movement of the cutters through a cutting stroke, means responsive to completion of the cutting stroke for initiating release of the clamping means, and means responsive to return of the clamping members to the release positions for initiating a subsequent step of the advancing means.

In order that the invention may be readily understood, one embodiment thereof will now be described by way of example with reference to the accompanying drawings, in which:

FIG. 1 is an end elevation of the machine at the entry end;

FIG. 3 illustrates a length of corrugated thermoplastic tubing in which perforations have been made by the machine at accurately spaced locations;

FIG. 4 illustrates a detail of a drive mechanism shown in FIG. 1;

FIG. 6 illustrates the drive system for the tube advancing means;

FIG. 7 is a sectional view showing a detail of the tube advancing means, the latter being shown in engagement with the tubing;

FIG. 8 illustrates a detail of the tube advancing means;

FIG. 9 is a perspective view of the drive mechanism for one set of cutters;

Figure 12:
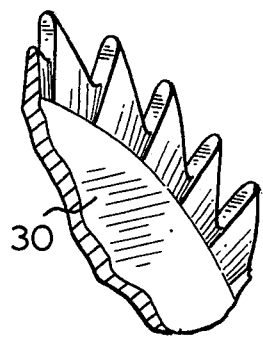
FIG. 12 is an enlarged fragmentary view showing a preferred type of cutter.

The drawings illustrate a machine for perforating corrugated tubing at accurately spaced locations, and a control system therefor. The machine illustrated in FIGS. 1, 2 and 4 to 9 is specially adapted for cutting slot-like perforations in corrugated thermoplastic tubing, a detail of such tubing after slotting being shown in FIG. 3. It will be seen that the slot-like perforations 10 are located in the valleys 11 between adjacent corrugations 12 and are spaced in rows separated by 90°. The ends of the slots 10 are rounded and are formed by rotary saws whose teeth have rounded cutting edges as shown in the detail of FIG. 12. By rounding the ends of the slots any tendency to splitting or breaking of the tubing along the valleys is minimized.

The tubing is fed to the machine directly from an extruder and corrugator and is received by a feeder for advancing the tubing 13 along a predetermined path in intermittent steps. The feeder is carried by the frame structure 14 of the machine and comprises a pair of endless conveyor chains 15, 15' which pass over sprockets 16, 17 and 16', 17', the driving sprockets 16, 16' being coupled by a gear train 18 so as to drive in synchronism. The conveyor chains extend longitudinally with respect to the feed path and have opposed forward runs which are positioned to engage diametrically opposite sides of the tubing. As shown in FIGS. 7 and 8, each chain link carries a profiled member 19 which is shaped to provide a rounded transverse ridge 20; the ridges 20 engage in the valleys of the tubing 13 and so locate the tubing positively with respect to the conveyors.

As illustrated in FIG. 6, the conveyor chains are driven by a double-acting linear actuator. This comprises a double-acting air cylinder 21 which drives a rack gear 22; the rack gear 22 meshes with a pinion 23 which is coupled to a sprocket 39 via an air clutch 24 and a chain drive 25, the drive sprockets 16, 16' of the feeder being driven in synchronism from the gear train 18. Limit switches $W_2$, $W_4$ engage the rack gear 22 at the ends of its stroke and are operated thereby to control subsequent steps in the sequence of machine operations as hereinafter described. As the tubing 13 is advanced intermittently it is held in its path by guide rails 26.

At the end of each step of its forward movement the tubing is clamped in the stationary position where it is held by a pair of opposed clamping members 27, 27'. Each clamping member has a clamping face which is matched to the corrugations of the tubing so as to locate the tubing positively. The clamping members are interconnected by a linkage mechanism 28 and driven in synchronism between their respective clamping and release positions by a reciprocatory air cylinder 29. A limit switch $W_5$ is positioned to engage the linkage mechanism 28 when the clamping members are in the clamping position and is operable thereby to initiate a subsequent step in the sequence of operations as hereinafter described.

Mounted on the machine frame structure 14 are four sets of rotary saws 30, the saws of each set being aligned coaxially and driven by an electric motor 31 through a belt drive 41 (FIG. 9). The sets of cutters or saws are mounted symmetrically with respect to the path along which the tubing travels, and are interconnected by a linkage mechanism 32 such that the saws are constrained to move in synchronism through their respective cutting strokes. The saws of each set are positioned in relation to the clamping members 27, 27' so that each saw is constrained to move only in a plane which intersects a valley between adjacent corrugations of the tubing when the tubing is clamped in the stationary position. Such movement is effected by means of a double-acting air cylinder 33 (FIG. 4) which is coupled by rack and pinion gearing 34, 35 to an eccentric 36 (FIG. 2) connected to the mechanism 32 by a link 37. A limit switch $W_3$ is operated in response to one complete turn of the eccentric 36, corresponding to movement of each saw along a closed path terminating at the initial position and representing one complete cutting stroke. At the end of each stroke of the air cylinder 33 a limit switch $W_6$ is operated (FIG. 4) and prepares a circuit for initiation of the return stroke of the cylinder as hereinafter described.

Figure 11:
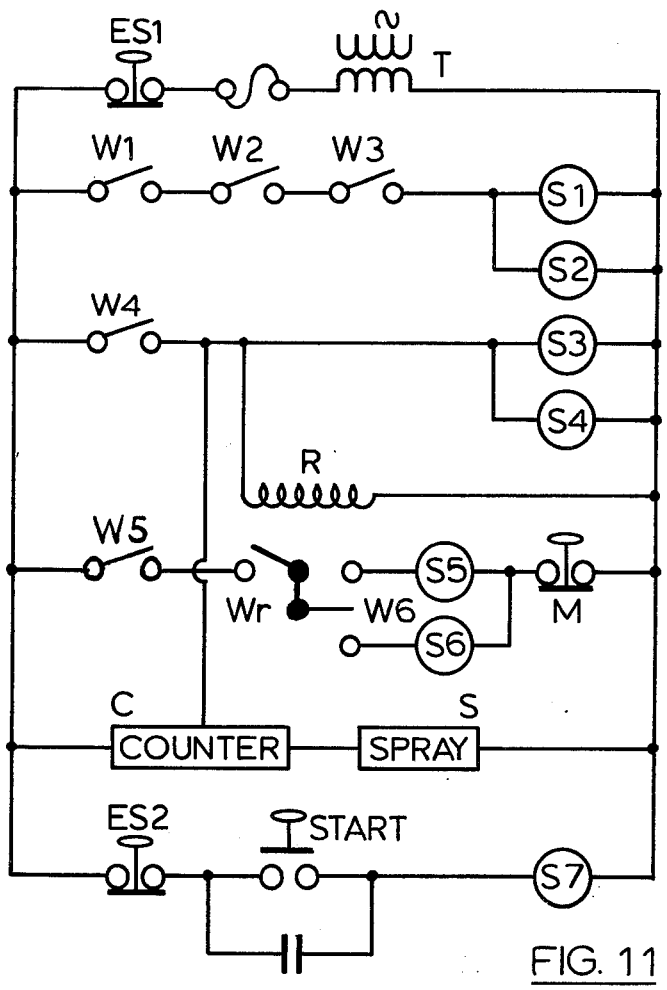
FIG. 11 is a schematic wiring diagram of the control circuit of the machine.

The sequence of machine operations will now be described with reference to the wiring diagram of FIG. 11. All machine movements are effected by air cylinders under the control of an electrical control circuit, this being energized from a mains supply through a mains transformer T. The cutters 30 are driven by the motors 31 which are controlled by a contactor S7; this valve is energized as soon as the START switch is depressed. An emergency stop switch ES2 is provided in series with the START switch for stopping the cutters in an emergency. In operation of the machine, as the tubing is fed from the extruder and corrugator, slack builds up in the tubing on the input side of the machine. When sufficient slack has built up, a switch $W_1$ is closed; switches $W_2$ and $W_3$ are already closed since the linear motor 21 and the saws 30 are in their starting positions. Solenoid valves S1 and S2 are therefore energized. The solenoid valve S1 operates the air cylinder 29 through one stroke in which it moves the clamping members 27, 27' from the clamping position to the release position. The solenoid valve S2 operates the air cylinder 21 and air clutch 24 through one stroke to drive the conveyor chains 15, 15' so that the tubing is advanced by a distance determined by the length of stroke of the air cylinder 21. At the end of this stroke the limit switch $W_4$ is closed and solenoid valves S3 and S4 are energized. Solenoid valve S3 now operates the air cylinder 29 to move the clamping members into the clamping position at which the tubing is positively located, the limit switch $W_5$ being closed thereby. The solenoid valve S4 operates the air cylinder 21 and releases the air clutch so that the rack gear 22 is returned to its initial position, the conveyor chains remaining stationary. Upon return of the rack gear 22 to its initial position the switch $W_2$ closes, but switch $W_3$ by this time will have opened as the cutters will be making a cutting stroke.

Closure of switch $W_4$ causes a coil R to be energized, and this closes a contact $W_r$ after a time delay. Upon closure of contact $W_r$, the switch $W_5$ being closed, a solenoid valve S5 or S6 is energized, depending upon the setting of switch $W_6$, the effect of which is to drive the air cylinder 33 through one stroke, the cutters thereby being driven through one complete cutting stroke. Thus the slot-like perforations 10 are formed at the required locations while the tubing is clamped in position. Upon completion of the cutting stroke the switch $W_3$ is again closed, and the cycle of machine operations is repeated. A counter C is advanced by one unit each time the switch $W_4$ is closed, the number recorded by the counter at any given time being a direct measure of the length of tubing advanced since the counter was reset. By setting the counter C to actuate a paint spray gun S at a preselected count, a marking may be applied to the tubing to indicate a preselected length of tubing fed through the machine.

An emergency stop switch ES1 is provided for shutting down the machine in an emergency. A manual switch M is provided in series with the solenoids S5 and S6 for rendering the cutter mechanism idle during certain sequences if desired whereby the machine can be used to make the perforations only at certain regions of the tubing as it is advanced.

Figure 2:
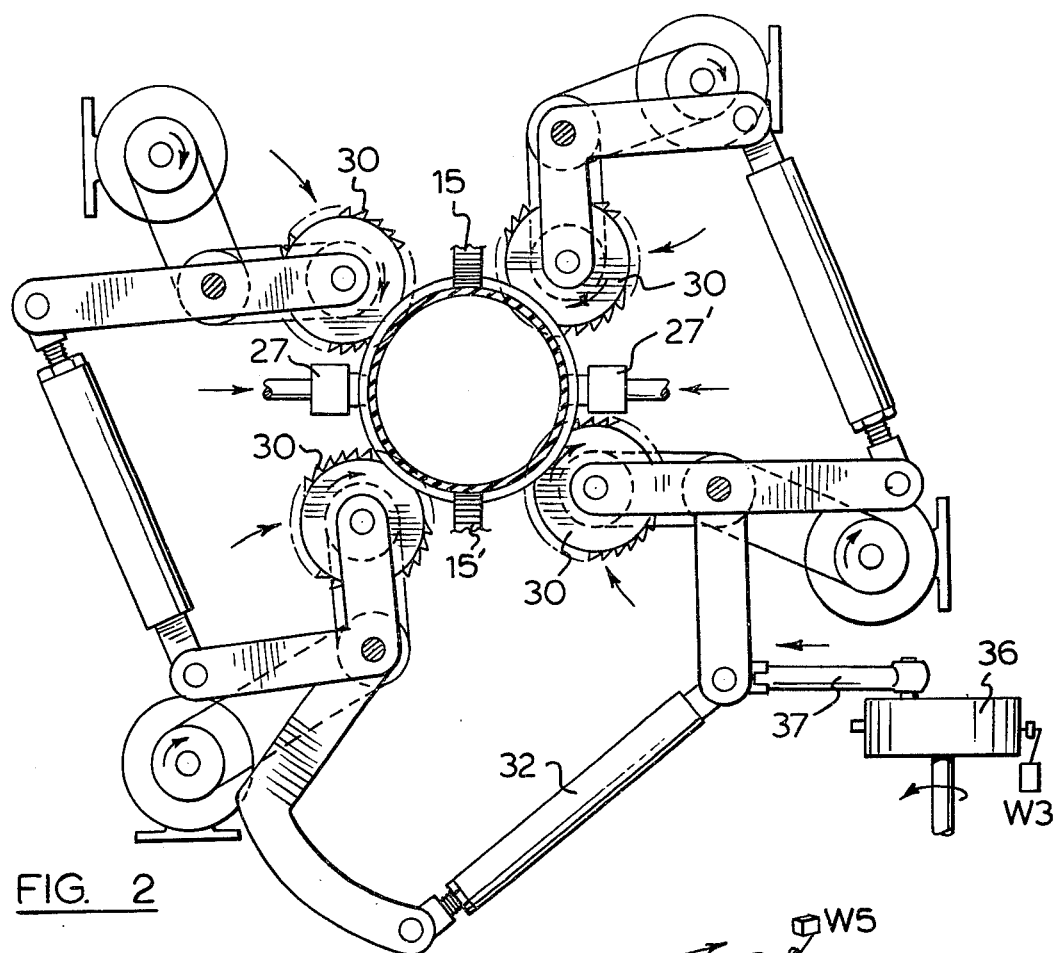
FIG. 2 is a simplified view corresponding to FIG. 1, but showing the cutters in a cutting position and also showing drive means for the cutters.
Figure 5:
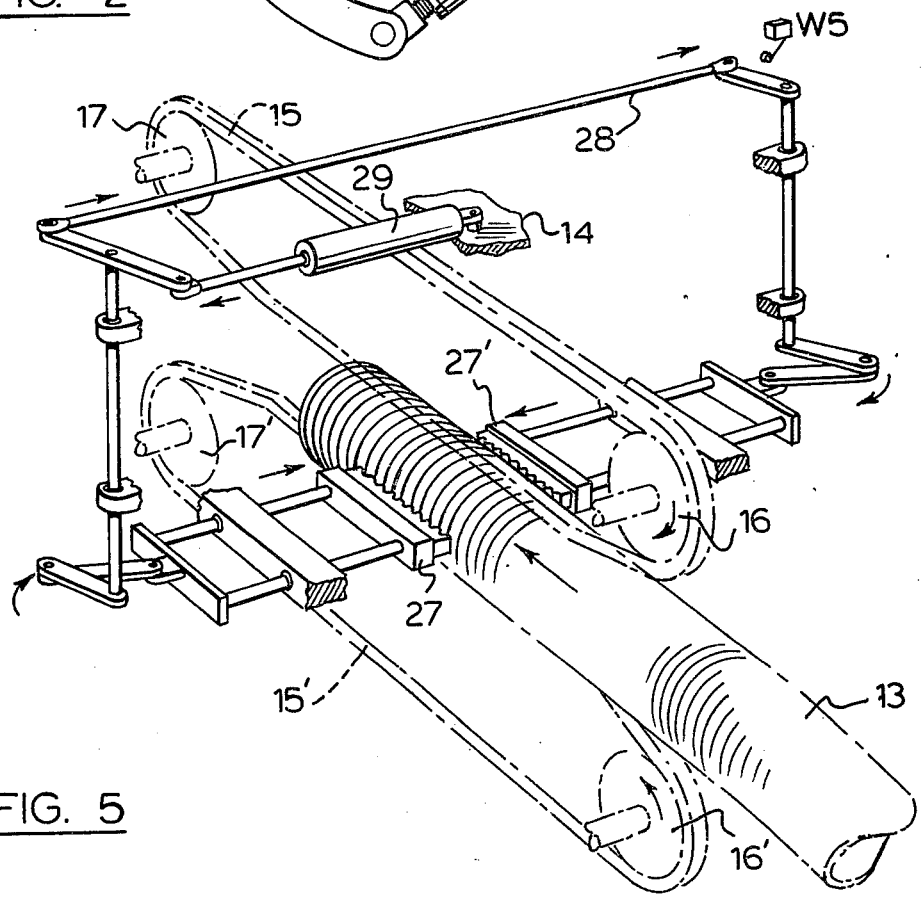
FIG. 5 illustrates the clamping means and associated parts.
Figure 10:
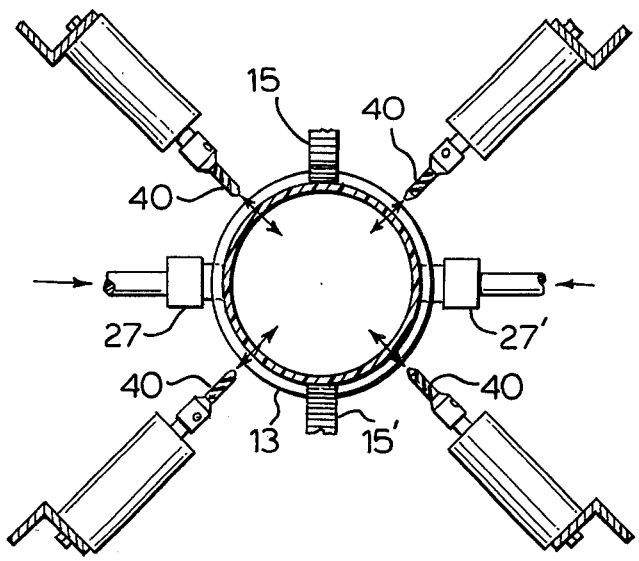
FIG. 10 shows a detail of a modified machine in which different cutters are used.

Instead of providing slot-like perforations, the machine may be adapted for the drilling of circular holes in the tubing according to customers' requirements. For this purpose the rotary saws are replaced by rotary drills 40 as shown in FIG. 10, the drills being aligned radially with respect to the feed path of the tubing and being advanced into the tubing and returned to their initial positions once per cutting stroke. The drills need not be equally spaced as shown, but would be oriented so as to drill the holes at the positions required.

What I claim as my invention is:

1. A machine for perforating corrugated tubing at accurately spaced locations, comprising:

a frame structure, means for advancing the tubing along a predetermined path in intermittent steps of equal length, releasable clamping means mounted on the frame structure and operable to clamp the tubing in a stationary position relative thereto, the clamping means comprising a plurality of clamping members each movable between clamping and release positions and each having a clamping face matched to the corrugations of the tubing for locating the tubing positively in the stationary position, a plurality of cutters mounted on the frame structure, each cutter being operable to move through a cutting stroke lying in a plane which is transverse to said path and intersects a valley between adjacent corrugations of the tubing when the tubing is clamped in said stationary position, means responsive to completion of a step of said advancing means for initiating movement of the clamping members into the clamping position, means operable in accordance with movement of the clamping members into the clamping position for initiating movement of the cutters through a cutting stroke, means responsive to completion of a cutting stroke for initiating release of said clamping means, and means responsive to return of the clamping members to the release positions for initiating a subsequent step of said intermittent advancing means.

2. A machine according to claim 1, wherein said means for advancing the tubing comprises a pair of endless conveyor chains passing over sprockets and extending longitudinally with respect to said predetermined path, the conveyor chains having forwards runs positioned to engage diametrically opposite sides of the tubing.

3. A machine according to claim 2, wherein each chain link carries a profiled member defining a transverse ridge which is adapted to engage in a valley between adjacent corrugations of the tubing, the spacing of said profiled members corresponding to the spacing of the corrugations.

4. A machine according to claim 3, wherein the conveyor chains are driven by an intermittent drive mechanism comprising:
   a double-acting linear actuator,
   a rack gear driven by the actuator,
   a pinion engaging the rack, and
   an air clutch, the pinion being coupled to the sprockets by the air clutch for driving the sprockets intermittently in one direction.

5. A machine according to claim 4, wherein the linear actuator is a double-acting air cylinder.

6. A machine according to claim 5, wherein said means responsive to completion of a step of said advancing means comprises a limit switch engageable with the rack upon completion of the step.

7. A machine according to claim 6, including means responsive to completion of a step of said advancing means for initiating return of the rack to its initial position, and a second limit switch engageable with the rack upon return of the rack to its initial position, said means for initiating a subsequent step of said intermittent advancing means being controlled by said second limit switch.

8. A machine according to claim 1, said clamping means comprising a pair of opposed clamping members, a linkage mechanism interconnecting the clamping members, the clamping members being constrained thereby to move in synchronism between their respective release and clamping positions, and reciprocatory drive means connected to the linkage mechanism for moving the clamping members.

9. A machine according to claim 8, including a limit switch responsive to completion of movement of the clamping members to the clamping position, said means for initiating movement of the cutters through a cutting stroke being controlled by said limit switch.

10. A machine according to claim 1, wherein the cutters are arranged in sets, the cutters of each set being longitudinally aligned, the sets of cutters being interconnected by a linkage mechanism and constrained thereby to move in synchronism through their respective cutting strokes, the cutters being operable by a reciprocatory drive means connected to the linkage mechanism.

11. A machine according to claim 10, including a limit switch responsive to completion of a cutting stroke, said means for initiating release of the clamping means being controlled by the limit switch.

12. A machine according to claim 11, in which the cutters are rotary drills aligned radially with respect to said predetermined path.

13. A machine according to claim 11, wherein the cutters are rotary saws, the saws of each set being coaxially aligned, and the linkage mechanism defining for each set a closed path of movement of the saws on each cutting stroke.

14. A machine according to claim 1, including a counter operable by said advancing means for counting the intermittent steps thereby to measure the accumulated length of tubing advanced as the product of the number of steps and their individual length.

15. A machine according to claim 14, including marking means operable by the counter for applying markings to the tubing at intervals determined by a counter setting corresponding to a preselected length of tubing.

* * * * *